Dec. 22, 1925.

A. RUTISHAUSER

MOWING MACHINE

Filed July 6, 1925

1,567,013

Inventor
Arnold Rutishauser
By Henry Otto Jr.
atty.

Patented Dec. 22, 1925.

1,567,013

UNITED STATES PATENT OFFICE.

ARNOLD RUTISHAUSER, OF OLTEN, SWITZERLAND.

MOWING MACHINE.

Application filed July 6, 1925. Serial No. 41,644.

*To all whom it may concern:*

Be it known that I, ARNOLD RUTISHAUSER, a citizen of the Swiss Republic, residing at Olten, Switzerland, have invented an Improvement in Mowing Machines, of which the following description, in connection with the accompanying drawings, is a specification, like characters on the drawings representing like parts.

The invention relates to improvements in mowing machines of the type in which a cutter beam is transversely arranged on a central cantilevered frame part and a blade is moved to and fro above the cutter beam by the movement of the cutter blade for diverting the cut material and distributing it in two swaths in order to prevent the material from banking up at the cantilevered frame part.

According to the present invention the distributing blade moving to and fro forms surfaces rising in the direction of the cantilevered frame part from the front towards the rear and serving to divert the cut material deposited thereon by acting from below, i. e. in the direction of the smallest resistance, on the material which is thereby separated and deposited to both sides of the cantilevered frame part.

Experience has shown that in this manner a banking up of the cut material at the frame part is avoided even when for instance the grass to be cut is much entangled, or when it is pressed towards the ground, or wet and partly rotted. In this manner a continuous mowing is renderd possible under difficult working conditions.

Constructional examples of the subject matter of the present invention are illustrated on the accompanying drawings, in which.

Figure 5:
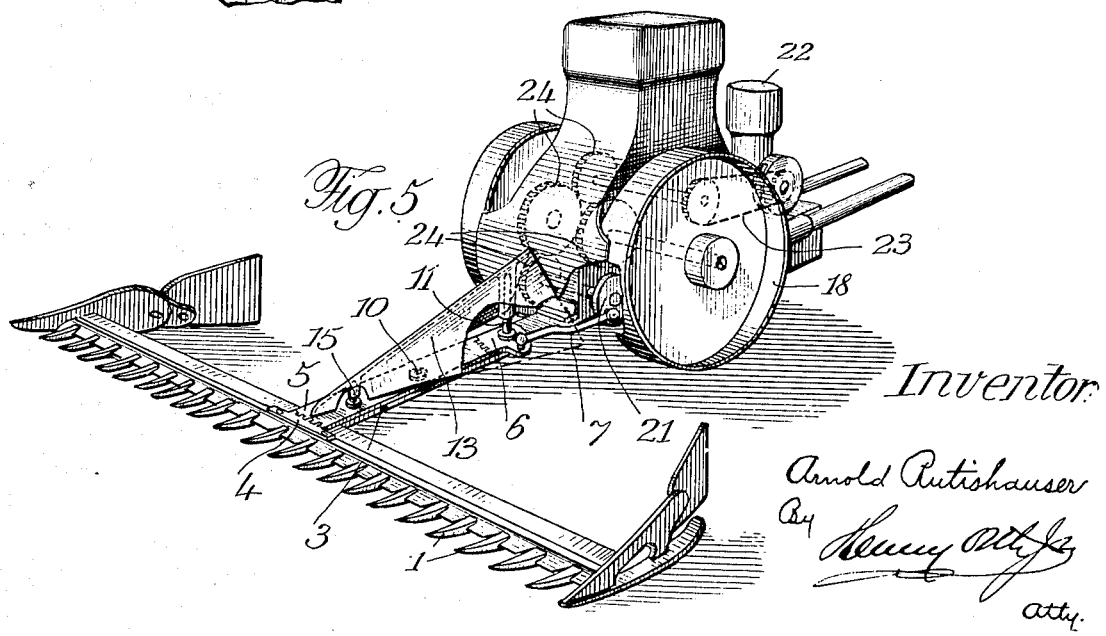
Fig. 5 is a perspective view of the whole mowing machine.

Referring now to the drawings, 1 denotes the knife-beam fixed in the middle of its length to a cantilevered frame part 3, arranged in the longitudinal centre plane of the machine so that the cutting mechanism is situated in front of the running wheels 18. 3' designates the knife or cutter blade to which a reciprocating movement is imparted through the intermediary of a toothed rack 4 and a two-armed swinging lever 5 cooperating with the rack 4. 10 denotes the turning axle of the winging lever 5, which cooperates with an actuating lever 6 by means of toothings, and an oscillating movement is imparted to the lever 6 by a connecting rod 7 operatively connected to a crank disc 21 (Fig. 5) The crank disc 21 is rotated by the motor 22 through the interposition of a chain drive 23 and gear wheels 24.

Figure 3:
Fig. 3 is a section along line III—III in Fig. 1 in which the distributing blade is assumed to be in its mid-position.

The vertical turning axle or pivot pin 11 of the driving lever 6 serves for turnably mounting the rear portion of the distributing member 13 which tapers towards its front. The shape of the member 13 in a plan view corresponds to a triangle having one corner towards the front, is a cross-section the member 13 is roof-shaped as is shown in Fig. 3. The longitudinal edge or ridge of the member 13 defines the surfaces rising in the direction of the cantilevered frame part 3 from the front towards the rear and serving for deviating the cut material. The shape of the member 13 is favourable for throwing off the cut material deposited on the member and the latter forms at the same time an adequate protection for the driving parts situated below the member 13.

The distributing member 13 is oscillated to and fro by the action of a pin 15 fixed to the oscillating lever 5 and the greatest amplitude of the oscillating movement is present in this case at the front of the member.

Figure 1:
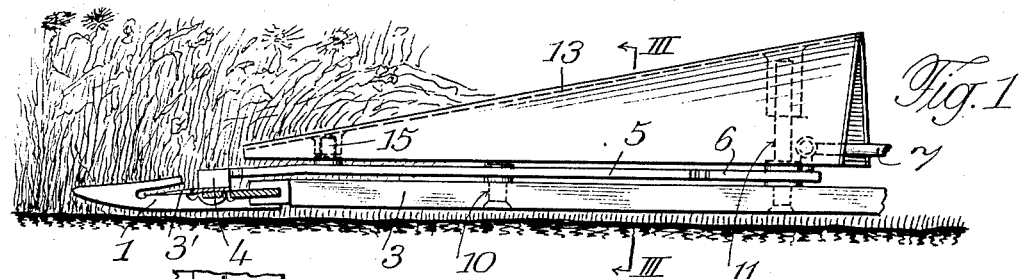
Fig. 1 is a side elevation of the first constructional example.
Figure 2:
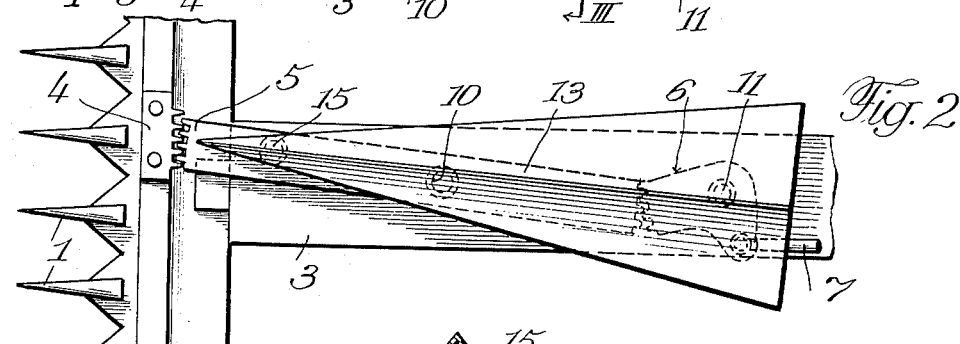
Fig. 2 is a plan view of Fig. 1.
Figure 4:
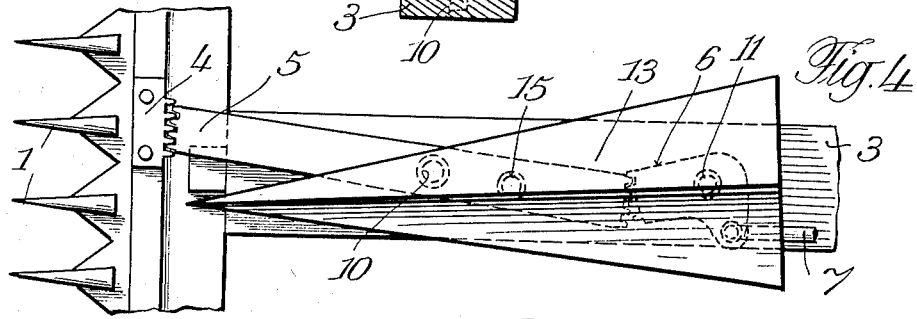
Fig. 4 is a plan view of a second constructional example.

The pin 15 is arranged in front of the pivot pin 10 of the oscillating lever 5 (Figs. 1 and 2) whilst in the second constructional example the pin 15 is situated at the rear of the pivot 10 (Fig. 4); in the first constructional example the oscillating lever 5 and the distributing member 13 move in the same direction, in the second example they move in opposite directions which is advantageous with a view of balancing the masses.

The distributing member 13 which oscillates and projects below the cut material separates or tears asunder the material which has been deposited astride on its rising ridge. This separating action occurs from below, i. e. in the direction of the smallest resistance, and the material is thrown to the right and to the left of the cantilevered part 3.

I claim:

1. In a mowing machine, the combination with a wheeled frame having a middle, forwardly projecting part and a cutter, of a distributing member extending toward the cutter and having surfaces rising from the front towards the rear and mounted above said forwardly projecting part, and means to impart an oscillating movement in a substantially horizontal plane to said distributing member for separating the cut material falling on said distributing member and laying it in two swaths to both sides of said part.

2. In a mowing machine, the combination with a wheeled frame having a middle forwardly projecting part and a cutter mechanism carried across the front end of said part and a cutter vibrating mechanism of a distributing member extending toward the cutter mechanism and having surfaces rising from the front towards the rear and being shaped like an inverted V in cross-section and triangular in plan view, and an operative connection between said cutter vibrating mechanism and said distributing member for imparting an oscillating movement in a substantially horizontal plane to said distributing member for separating the cut material falling on said distributing member and laying it into two swaths to both sides of said frame part.

3. In a mowing machine, the combination with a wheeled frame having a middle forwardly projecting part and a cutter mechanism carried across the front end of said part and a cutter vibrating mechanism including an oscillating lever, of a distributing member extending toward the cutter mechanism and having surfaces rising from the front towards the rear and being shaped like an inverted V in cross-section and triangular in plan view, a vertical pin projecting from said frame part and forming the pivot for said distributing member, and a vertical pin on said lever of the cutter vibrating mechanism and engaging said distributing member for imparting an oscillating movement in a substantially horizontal plane to said distributing member for separating the cut material falling on said distributing member and laying it into two swaths to both sides of said frame part.

4. In a mowing machine, the combination with a wheeled frame having a middle forwardly projecting part and a cutter mechanism carried across the front end of said part and a cutter vibrating mechanism, including a two-armed oscillating lever of a distributing member extending toward the cutter mechanism and having surfaces rising from the front towards the rear and being shaped like an inverted V in cross-section and triangular in plan view, a vertical pin projecting from said frame part and forming the pivot for said distributing member, and a vertical pin on said lever of the cutter vibrating mechanism and engaging said distributing member for imparting an oscillatory movement in a substantially horizontal plane to said distributing member for separating the cut material falling on said distributing member and laying it into two swaths to both sides of said frame part, said vertical pin being fixed to that arm of the two-armed oscillating lever which ensures the movement of said lever to be in opposition to the movement of the distributing member.

In testimony whereof I affix my signature.

ARNOLD RUTISHAUSER.